United States Patent [19]
Bach et al.

[11] Patent Number: 4,603,769
[45] Date of Patent: Aug. 5, 1986

[54] GRAIN CHUTE SYSTEM

[76] Inventors: Bert Bach, 270 West End Ave., New York, N.Y. 10023; David Bach, 34 Park Ln., Minneapolis, Minn. 55416

[21] Appl. No.: 631,099

[22] Filed: Jul. 16, 1984

[51] Int. Cl.[4] .................... B65G 11/06; B65G 11/00; B65G 1/00
[52] U.S. Cl. ....................................... 193/12; 193/29; 414/291
[58] Field of Search ...................... 193/12, 13, 14, 28, 193/29, 34; 414/288, 291, 328; 98/87; 52/192, 193, 194, 195, 196; 49/70, 95, 96; 55/385 R

[56] References Cited

U.S. PATENT DOCUMENTS

| | | | |
|---|---|---|---|
| 483,404 | 9/1892 | Steubner | 193/29 |
| 939,830 | 11/1909 | Haenke | 193/29 |
| 1,861,976 | 6/1932 | Pardee | 193/12 |
| 4,306,895 | 12/1981 | Thompson et al. | 193/29 X |

Primary Examiner—Andres Kashnikow
Assistant Examiner—Patrick N. Burkhart
Attorney, Agent, or Firm—Eliot S. Gerber

[57] ABSTRACT

In a grain elevator, grain mixed with dust is delivered near the top of a grain silo to the receiving orifice of a grain chute. The chute includes an enclosed conduit which extends from the top of the grain silo to its floor and deposits the grain in the silo without freely falling in the interior of the silo. The conduit has a tandem column series of vertically extending doors which are counter-balanced to be normally closed and which are opened by the weight of the grain in the conduit. The fall of the grain within the conduit separates the grain from the dust and the dust is removed by an exhaust fan connected to the conduit, the air flow being through the open bottom doors of the conduit, through the conduit, and out of the silo to a tube connected to a dust separator. In addition, the grain falls within the conduit and flows out of the doors which the grain column opens and which are immediately above the level of the grain already delivered into the silo, the other doors remaining closed.

9 Claims, 5 Drawing Figures

GRAIN CHUTE SYSTEM

BACKGROUND OF THE INVENTION

The present invention relates to grain elevators and more particularly to a chute system to deliver grain to a silo.

At the present time grain elevators are commonly used to receive and store grain such as wheat. The grain is lifted by a conveyor belt or a pneumatic tube to a door near the top of the grain silo where it is dumped into the silo. The silo is generally a large cylindrical building and may be typically 150 feet high and 60 feet in diameter. The grain is mixed with dust and typically the amount of dust may be from 3 percent to 6 percent of the mixture.

When the grain is dumped into the silo, it falls through air and some of the dust becomes separated from the falling grain, since the dust is lighter. The dust may form a dusty atmosphere, which is highly explosive. There have been numerous reported incidents of grain elevator explosions and fires. The delivery of grain into the grain silo is considered a dangerous period and care is taken to avoid sparks which would ignite an explosive atmosphere that may be found in the silo. To prevent build-up of such an explosive atmosphere, some silos have been provided with a large exhaust fan, for example, rated at 150 HP, which helps exhaust the dusty atmosphere from the silo. Such exhaust fans are relatively expensive to install and operate and may not completely solve the problem of preventing the build-up of an explosive atmosphere in the silo.

The patent literature contains many examples of grain chutes and chutes for other types of products. In U.S. Pat. No. 3,887,503 entitled "Gravity Chute Systems", a chute for soiled laundry or solid waste is intended to prevent compaction at the bottom and comprises a series of riser conduit sections. U.S. Pat. No. 3,797,625 entitled "Silo Chute With Separate Discharge Tube" discloses a chute, outside the silo, to discharge ensilage and has a vertical series of normally closed doors. In U.S. Pat. No. 4,066,158 entitled "Chute Construction" a security storage chamber for mail bags utilizes a collapsible chute. In U.S. Pat. No. 3,961,693 entitled "Inverted Silo Chutes Having Swingable Side Wall Panels" a bowed closable discharge chute is inside the silo. In U.S. Pat. No. 1,779,412 entitled "Coal Filling Chute" the chute has internal baffles. In U.S. Pat. No. 2,750,021 entitled "Distributor For Grain And The Like" an endless chain carries a camming device which opens doors in sequence. In U.S. Pat. No. 3,931,877 entitled "Material Diverter Structure" a tubular member within the chute cooperates with a carriage mounted diverter. U.S. Pat. No. 728,626 entitled "Conveyor" shows a package conveyor in the form of a spiral chute. U.S. Pat. No. 803,944 entitled "Conveying Apparatus" relates to bulky packages (sacks) and the loading of vessels and shows a chute having a plurality of doors and diverter baffles.

In addition, the non-patent literature contains references to the problems caused by the dust mixed with grain. An article in the July 8, 1982 issue of the *Wall Street Journal* states that grain dust explosions have killed more than 400 workers since 1960 and 108 workers since 1977. Another article, Dec. 12, 1983, in the *Wall Street Journal* discusses proposed Labor Department standards for grain elevators which would limit the floor dust to ⅛-inch thick or require clean-up after shift or require pneumatic dust control systems.

Flour mill dust (diameter 15 $\mu$microns or 15/1000 mm) is a mechanical dispersoid in a gas (atmosphere). It is considerably smaller and lighter than the grain particles. The use of mechanical dust separation using filters, centrifugal cyclones, electrostatic precipitators and elongated fabric bags is known from conventional chemical engineering texts.

OBJECTIVES AND FEATURES OF THE INVENTION

It is an objective of the present invention to provide a chute system for a grain silo in which the amount of dust raised, when delivering grain into the silo, is reduced, to decrease the likelihood of fire or explosion.

It is a further objective of the present invention to provide such a chute system that will aid in separating the grain from its dust and will deliver grain having relatively less dust into the silo.

It is a further objective of the present invention to provide such a chute system that will operate to reduce dust in the silo using a smaller size exhaust fan system, and thereby conserve operating energy and reduce the cost of installation of an exhaust system or a dust separation system.

It is a further objective of the present invention to provide such a chute system that will be relatively maintenance-free and that will operate in the dusty environment of a grain silo.

Although the present invention will be described principally in terms of a wheat storage bin (silo), which is a cylindrical storage bin which is part of a grain elevator, it will be understood that it may be used with other grains and with non-cylindrical storage bins.

It is a feature of the present invention to provide a silo (grain bin) with a grain chute which reduces the free-floating dust in the silo and reduces the dust when the grain is being delivered to the silo.

The grain chute is associated with the silo and may be outside the silo, attached to its outer wall or is inside the silo along a wall or in its center. The grain chute has orifice means, such as a door opening, to receive grain to be delivered into the silo.

A chute means is connected to the orifice means and conducts the grain by gravity. The chute means extends from the orifice means to the bottom, or near the bottom, of the silo and includes an elongated hollow conduit. The chute also includes a plurality of doors in the conduit, the doors being arranged one above the other. In one embodiment, the conduit is square and has four vertical series of doors, with doors on all four sides. In another embodiment the chute is round, in cross-section. The chute also includes door balance means, such as a counter-weight or a spring, to open each door when the height of the grain in the conduit reaches that door. The grain exits from the chute at the silo only at the door which is directly at the level of the grain, while the doors above the opened door remain closed. The doors are opened by the pressure of the column of grain within the conduit. The doors are kept normally closed by a door balance means, such as a counterweight. An exhaust fan provides an air flow in the conduit, which pulls the dust while permitting the grain to fall. The air flow is through the opened door and out a tube to a dust separator. In one embodiment, the opening of a door at the level of the grain will also open an air flow port at that level, the door being connected to a stopper (air port valve means) which normally closes the air flow port.

BRIEF DESCRIPTION OF THE DRAWINGS

Other objectives and features of the present invention will be apparent from the following detailed description of the invention, which should be taken in conjunction with the accompanying drawings.

In the drawings.

DETAILED DESCRIPTION OF THE INVENTION

The grain chute (grain chute means) of the present invention is particularly adapted for use in a grain silo which is part of a grain elevator. The grain silo typically is a reinforced concrete structure which is cylindrical and may be 150 feet high and 60 feet in diameter. It presently may take nine hours to fill a silo with grain. The grain chute is associated with the grain silo and is preferably mounted on the outer wall of the silo or inside the grain silo on its inner wall or centered in the silo (along the vertical centroidal axis).

Figure 1:
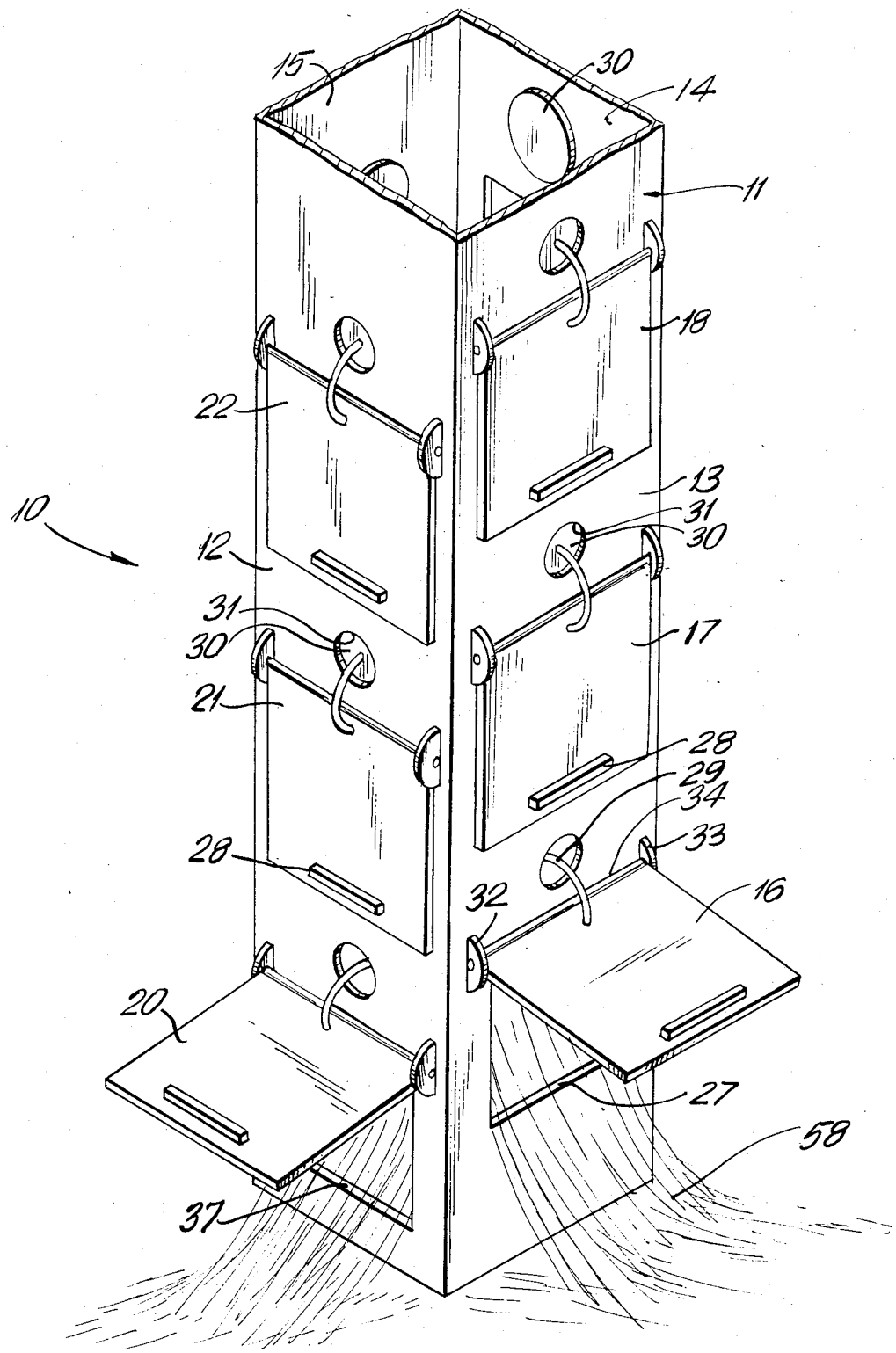
FIG. 1 is a perspective view of the grain chute of the first embodiment of the present invention.

As shown in FIG. 1, in one embodiment, the grain chute 10 comprises an elongated vertically positioned conduit 11 which is centered in the grain silo. The conduit 11 consists of four flat walls 12, 13, 14 and 15, with the walls 12 and 14 being parallel and spaced apart and the walls 13 and 15 being parallel and spaced apart. The conduit 11 in cross-section, i.e., seen in a plane vertical to the imaginary central axis of the conduit 11, is square, although other rectangular, triangular or rounded forms (in cross-section) may be used. The cross-sectional size of the conduit is small compared to the cross-sectional size of the grain silo. Typically, the walls 12-15 will be 18 inches to 30 inches in length to form a conduit, for example of four square feet in area. Preferably the maximum size of the walls 12-15 is three feet and the maximum square area of the conduit 11 is nine square feet. This may be compared to the much larger cross-sectional area of the silo itself; for example, the area ratio may be in the range of 2000-5000 to 1. The grain falls within the confined enclosed area of the conduit 11 and not within the unenclosed area of the silo, which greatly reduces the dust upon delivery of the grain. The chute in FIG. 1 is shown as being centered in the silo. However, it may be preferred to construct the chute along an inner wall of the silo (within the silo) or on an outer wall of the silo.

The conduit 11 has a tandem series of vertically aligned doors. The doors shown in FIG. 1 on the wall 13 comprise three doors 16, 17 and 18. It will be understood, however, that the FIG. 1 is only a small portion of the conduit 11. Preferably there are at least five doors in each vertical column of doors. Typically, the doors will be one foot wide and two feet high and the vertical spacing between the doors will be 6 inches. Consequently, in a grain elevator 150 feet high, there may be as many as 80 doors, one above the other. Preferably each wall of the conduit 11 has a vertically aligned series of doors. The wall 12 has doors 20, 21 and 22 which are offset in height (staggered) relative to the doors 16, 17 and 18. Similarly, the walls 14 and 15 each have a series of vertically aligned doors.

Figure 2:
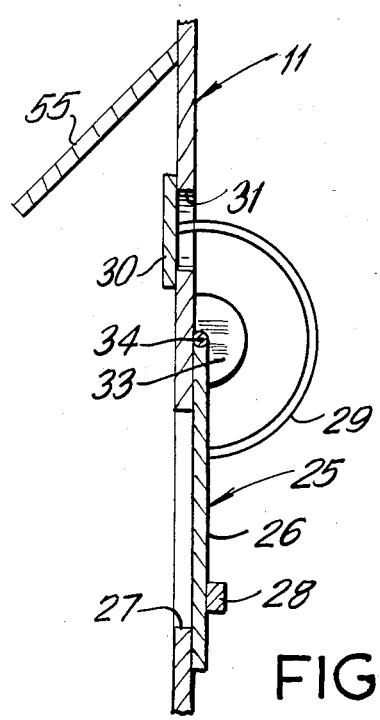
FIGS. 2 and 3 illustrate the doors on the grain chute of FIG. 1, with the doors closed in FIG. 2 and the doors open in FIG. 3.
Figure 3:
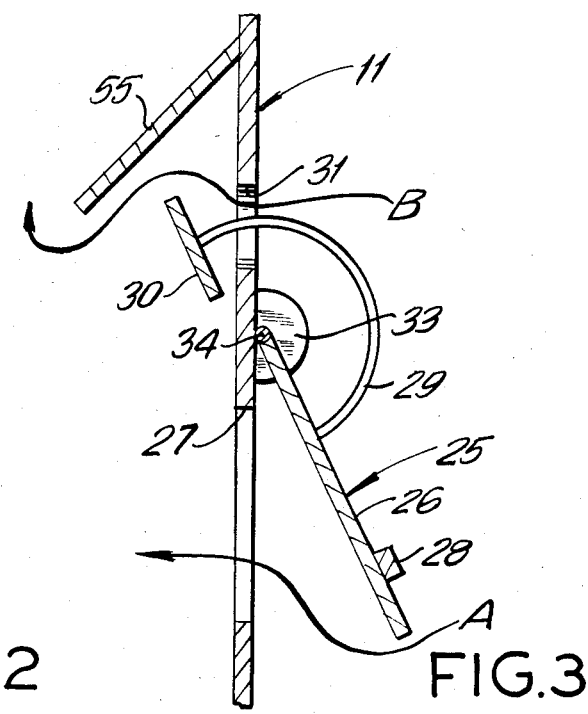

As shown in FIGS. 2 and 3, the doors have counterweight means so that they are easily openable by the weight of the grain loaded into the chute 11 and yet are normally kept shut. The doors are normally closed, i.e., without the force of the grain keeping the door open, the doors will automatically revert to their normally closed positions. In one embodiment of a door structure, the normally closed position of the door is shown in FIG. 2 and the open position of the door is shown in FIG. 3. Each of the doors 25 includes a door panel 26 which covers the opening 27 in the conduit. A counterweight 38 is fastened on the front face of the panel 26 and a port closure arm 29 is also attached to the panel 26. Alternatively, the doors may be of aluminum, or other lightweight material, so that they would normally remain closed and yet be openable by the weight of the grain from the conduit. A stopper (port closure) 30 is fixed at the end of the arm 29. The arm 29 protrudes through an air hole 31 in the conduit 11. Two opposite flange members 32 and 33 are used to pivotally mount the door 25. The door panel 26 is fixed to the rod 34 whose ends pivot within the holes in the flanges 32,33. The main air flow A is through the open door 25. However, there is an air flow B through the hole 31 when it is opened by removal (backward swing) of the stopper 30.

The baffles 55 prevent grain from falling out the open air holes 31 and prevent grain from falling on the stoppers 30 and the arm 29. As shown in FIG. 1, when the grain is loaded into the conduit 11 it starts to form a column of grain within the conduit. However, the weight of the column of grain will open the doors 16 and 20 and the corresponding doors in the walls 14 and 15. The grain will flow out of the openings 27,37 and the openings formed by the doors in the walls 14 and 15. The doors beneath the level of the grain 58 will remain open. However, since these doors are covered with the grain, no air will pass through their openings. The only open doors which will allow air through the door openings are the bottom doors which are opened by the flow of grain and which are above the level of the grain. The other doors 17, 18, 21, 22, etc., which are all of the doors above the open doors 16 and 20, will remain closed (in their normally closed position) and not permit air flow.

Figure 4:
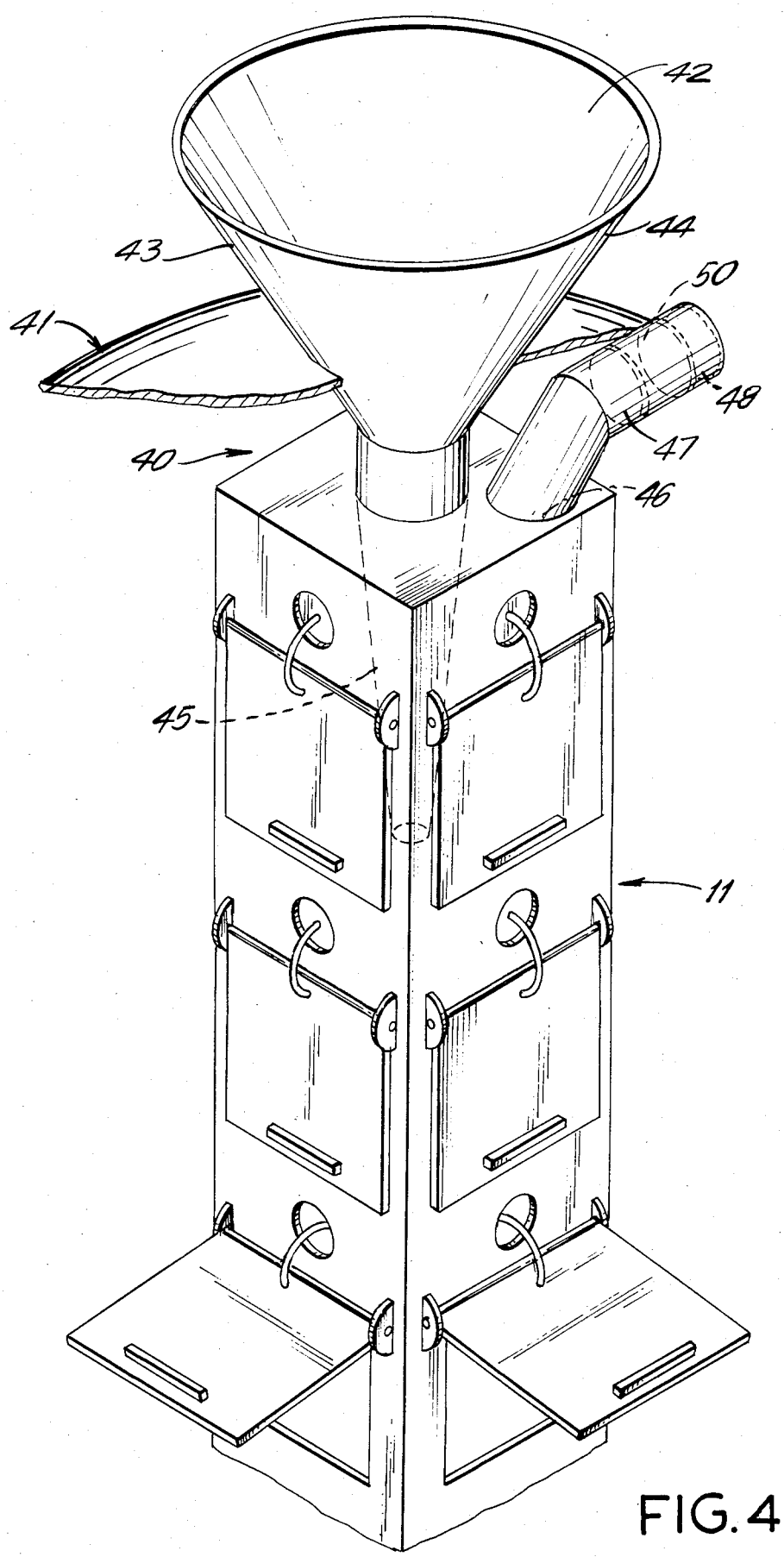
FIG. 4 is a perspective view of the top portion of the grain silo.

As shown in FIG. 4, the conduit 11 at its top portion 40, which is outside or near the top of the silo 41, has two orifices. The first orifice 42 is used to feed grain into the silo. It consists of a funnel 43 whose open top 44 receives the grain, for example, from a grain elevator, and whose neck 45 is within the conduit 11.

The second orifice 46 is used to exhaust the dust-laden air within the conduit 11. Preferably the entry port for the grain is below the level of the exhaust. The orifice 46 is connected to tube 47 which leads to the dust separator 48. The dust separator 48 may be of conventional construction in which dust-laden air is fed through elongated bags. The air will pass through the cloth of the bags and the dust will not. Consequently, the dust will collect at the bottom of the bags and may be removed by ports at the bottom of the bags. The bags are shaken, for example, by reverse air pulses or mechanically, on a timed basis in order to prevent the clogging of the cloth by the dust.

In the embodiment shown in FIG. 1, the grain, along with its dust, will freely fall within the chute 11. The exhaust fan is a relatively low power, for example, 1-3 HP, as it is exhausting air from only the small area of the conduit. The flow of the air upward within the conduit acts as a counter-flow to the falling grain and dust. The fall of the grain and the dust starts at the top of the conduit and separates the grain from the dust as they fall together down the pipe of the conduit. Such separation is aided by the counter-flow of the air which is exhausted by the exhaust fan 50.

Figure 5:
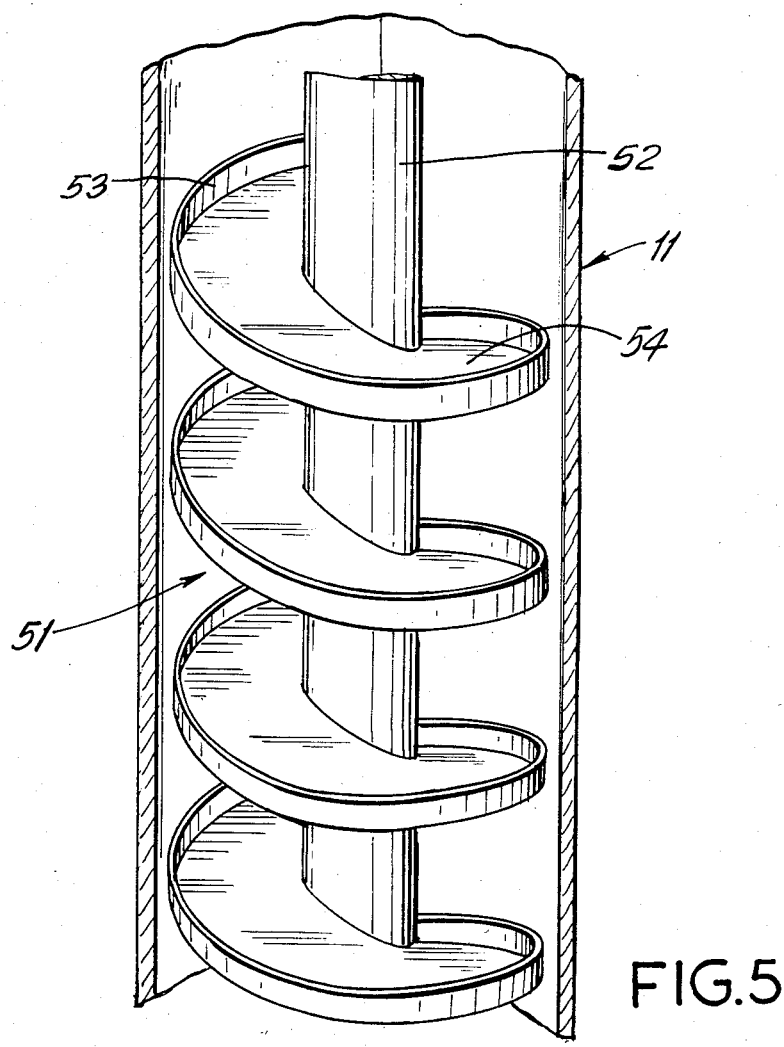
FIG. 5 is a perspective view of an alternative embodiment of the grain chute.

An alternative embodiment is illustrated in FIG. 5. In this embodiment the grain will tumble down a spiral instead of freely falling within the conduit. The spiral 51 is located within the conduit 11. The conduit 11 is of the same construction as that shown in FIG. 1 but, instead of being internally empty, it has an elongated spiral 51 which extends from the bottom of the conduit to its top. The spiral 51 may be formed about a central pillar 52, as shown, or may be attached to the chute walls without a central pillar (not shown). The spiral 51 has a spiral floor 54 and a side wall flange 53. The grain flows downward on the floor of the spiral. As the grain does not freely fall through air, less dust is raised. As in the prior embodiment, an exhaust fan removes dust from the conduit and the grain exits only through the bottom doors (at the level of the grain), which doors are opened by the grain within the conduit.

The chute may be formed "off-site", in a factory, in sections, and bolted together to be installed in new or existing silos, i.e., "retrofitted". Alternatively, the chute may be constructed "on-site", by welding or otherwise, joining sheet metal to form the chute.

Modifications may be made in the present invention within the scope of the subjoined claims. For example, the doors may be normally held closed by a spring instead of a counterweight; or the doors may be opened in sequence by motor means operated by a grain level sensor, such as an ultrasonic gauge; or the doors may be operated in sequence by a mechanical chain. As another modification, if the chute is outside the silo, it may have two columns of doors which open into the interior of the silo, the doors being at staggered levels.

What is claimed is:

1. A grain chute for a silo, the silo being adapted to receive, store and discharge grain, which grain when received contains dust;

the grain chute comprising:

orifice means to receive grain received into the silo;

chute means connected to said orifice means to vertically conduct the grain, said chute means extending from the orifice means to near the bottom of the silo, said chute means consisting of an elongated vertically oriented hollow conduit;

a plurality of door ports in said conduit arranged one above the other for the height of the conduit, and a door associated with each door port;

each of said doors having an air port valve means and the chute means having a plurality of air ports, with each air port of the chute means being closeable by the door valve means when the door is closed and being openable by said door valve means when said door is opened;

door balance means connected to each door to open the said door when the height of the grain in the conduit reaches the said door, so that the grain exits from the chute means only at the lowest door at the level of the grain in the silo and the doors above that opened door remain closed; and exhaust means to exhaust dust from the conduit while permitting the fall of the grain within the conduit.

2. A grain chute as in claim 1 wherein said conduit, in cross-section, is rectangular and said conduit comprises four opposite flat walls.

3. A grain chute as in claim 2 wherein said chute is centered in said silo and the doors are located in all four walls.

4. A grain chute as in claim 2 wherein there are said doors in each wall.

5. A grain chute as in claim 2 wherein the maximum length of a wall is three feet and the maximum cross-section area of the conduit in a plane perpendicular to the vertical is 9 square feet.

6. A grain chute as in claim 1 wherein each door includes a counter-balance means to aid in closing the door.

7. A grain chute as in claim 6 wherein said counter-balance means is a counter-weight.

8. A grain chute as in claim 1 wherein said exhaust means includes an exhaust fan near the top of the conduit to create an exhaust pressure, a tube connected to the exhaust fan, and a dust separator connected to said tube.

9. A grain chute as in claim 8 and further including a spiral having a floor within the conduit which permits the grain to flow down the floor of the spiral.

* * * * *